(12) United States Patent
Darmon et al.

(10) Patent No.: US 10,642,971 B2
(45) Date of Patent: May 5, 2020

(54) METHODS AND SYSTEMS FOR ENSURING PROGRAM CODE FLOW INTEGRITY

(71) Applicant: Cisco Technology, Inc., San Jose, CA (US)

(72) Inventors: David Darmon, Jerusalem (IL); Lev Yudalevich, Jerusalem (IL); Leonid Frenkel, Kfar Aza (IL); Yair Arzi, Jerusalem (IL); Yigal Dahan, Neriya (IL); Eyal Wasserman, Jerusalem (IL); Yaacov Belenky, Maaleh Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 15/694,881

(22) Filed: Sep. 4, 2017

(65) Prior Publication Data
US 2019/0073472 A1    Mar. 7, 2019

(51) Int. Cl.
*G06F 21/52* (2013.01)
*G06F 21/57* (2013.01)

(52) U.S. Cl.
CPC ............ *G06F 21/52* (2013.01); *G06F 21/577* (2013.01); *G06F 2221/033* (2013.01)

(58) Field of Classification Search
CPC ... G06F 21/52; G06F 21/577; G06F 2221/033
See application file for complete search history.

(56) References Cited

U.S. PATENT DOCUMENTS

| | | | |
|---|---|---|---|
| 6,560,774 B1 * | 5/2003 | Gordon | ............... G06F 9/44589 717/114 |
| 6,880,149 B2 | 4/2005 | Cronce | |
| 7,844,828 B2 | 11/2010 | Giraud et al. | |
| 8,429,417 B2 | 4/2013 | Salgado et al. | |

(Continued)

OTHER PUBLICATIONS

Danger, Jean-Luc et al.: HCODE: Hardware-Enhanced Real-Time CFI (2014), In Proceeding of the 4th Program Protection and Reverse Engineering Workshop (PPREW-4), ACM, New York, NY, USA, Article 6, 11 pages.

(Continued)

*Primary Examiner* — Matthew Smithers
*Assistant Examiner* — Mirza Israr Javed (57) ABSTRACT

In one embodiment a device is described, the device including a memory operative to store an program, a storage operative to store a reference check value for at least one operation in the program, a processor operative to execute the program, including, determining a run-time check value upon execution of the at least one operation in the program, comparing the stored reference check value with the run-time check value, storing the run-time check value as a pre-branch run-time check value prior to entering a conditional branch of the program when the compared stored reference check value and the run-time check value are equal values, resetting the run-time check value of the executing program to the pre-branch run-time check value upon exiting the conditional branch of the program, wherein the reference check value, the run-time check value, and the (Continued)

pre-branch run-time check value are determined as a result of a single function. Related apparatus, methods and systems are also described.

20 Claims, 6 Drawing Sheets

(56) References Cited

U.S. PATENT DOCUMENTS

| | | | |
|---|---|---|---|
| 8,782,434 B1* | 7/2014 | Ghose | G06F 9/3851 |
| | | | 713/190 |
| 8,782,435 B1* | 7/2014 | Ghose | G06F 9/3851 |
| | | | 713/190 |
| 9,405,936 B2 | 8/2016 | Hoogerbrugge et al. | |
| 2002/0032822 A1* | 3/2002 | Plummer | G06F 8/4442 |
| | | | 710/260 |
| 2005/0066311 A1* | 3/2005 | Hagmeier | G06F 11/3636 |
| | | | 717/128 |
| 2006/0047955 A1* | 3/2006 | Prevost | G06F 21/54 |
| | | | 713/165 |
| 2009/0328211 A1* | 12/2009 | Abraham | G06F 21/54 |
| | | | 726/22 |
| 2012/0066551 A1* | 3/2012 | Palus | G06F 11/28 |
| | | | 714/39 |
| 2013/0205285 A1* | 8/2013 | Pizlo | G06F 8/443 |
| | | | 717/151 |
| 2015/0007251 A1* | 1/2015 | Johns | H04L 63/20 |
| | | | 726/1 |
| 2017/0208150 A1* | 7/2017 | Ekbote | H04L 9/0643 |
| 2017/0262657 A1* | 9/2017 | Salmon-Legagneur | |
| | | | G06F 11/1004 |
| 2017/0270319 A1* | 9/2017 | Salmon-Legagneur | |
| | | | G06F 11/1004 |
| 2018/0307838 A1* | 10/2018 | Sharma | G06F 21/54 |

OTHER PUBLICATIONS de Clercq, Ruan et al., SOFIA: Software and Control Flow Integrity Architecture; 2016 Design, Automation & Test in Europe Conference & Exhibition (DATE), Dresden, 2016, pp. 1172-1177.

* cited by examiner

| CODE | CHECK VALUE |
|---|---|
| mov | 0x2545 |
| ldw | 0xA8E0 |
| stw | 0x4E79 |
| add | 0xE793 |
| sub | 0x1502 |
| Loop: | |
| ldb | 0x3981 |
| shl | 0x87EE |
| sub.f | 0x8150 |
| delta #imm8 | |
| jnz loop | 0x73E2 |
| setb | 0x812A |
| ... | |
| ret | |

FIG. 3

| CODE | CHECK VALUE |
|---|---|
| mov | 0x2545 |
| ldw | 0xA8E0 |
| stw | 0x4E79 |
| add | 0xE793 |
| sub | 0x1502 |
| delta #imm8 | |
| Loop: | |
| ldb | 0x3981 |
| shl | 0x87EE |
| sub.f | 0x8150 |
| | |
| jnz loop | 0x73E2 |
| setb | 0x812A |
| ... | |
| ret | |

FIG. 4

| CODE | CHECK VALUE |
|---|---|
| mov | 0x2545 |
| ldw | 0xA8E0 |
| stw | 0x4E79 |
| add | 0xE793 |
| sub | 0x1502 |
| | |
| ldb | 0x3981 |
| shl | 0x87EE |
| sub.f | 0x8150 |
| delta #imm8 | |
| bnz label | 0x73E2 |
| setb | 0x812A |
| ... | |
| label: | 0x73E2 |
| ret | |

METHODS AND SYSTEMS FOR ENSURING PROGRAM CODE FLOW INTEGRITY

TECHNICAL FIELD

The present disclosure generally relates to methods and systems for secure computational applications.

BACKGROUND

Secure computational applications include applications used in banking, conditional access, and other areas where physical, operational, or financial security is of concern. One concern in secure computational applications is that hardware and software execute pre-defined functionality of such applications as the functionality is intended to be executed, and not in some other fashion. A change in the functionality may generate security holes that can be exploited by attackers and/or hackers.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment a device is described, the device including a memory operative to store an program, a storage operative to store a reference check value for at least one operation in the program, a processor operative to execute the program, including, determining a run-time check value upon execution of the at least one operation in the program, comparing the stored reference check value with the run-time check value, storing the run-time check value as a pre-branch run-time check value prior to entering a conditional branch of the program when the compared stored reference check value and the run-time check value are equal values, resetting the run-time check value of the executing program to the pre-branch run-time check value upon exiting the conditional branch of the program, wherein the reference check value, the run-time check value, and the pre-branch run-time check value are determined as a result of a single function. Related apparatus, methods and systems are also described.

Exemplary Embodiment

Figure 1:
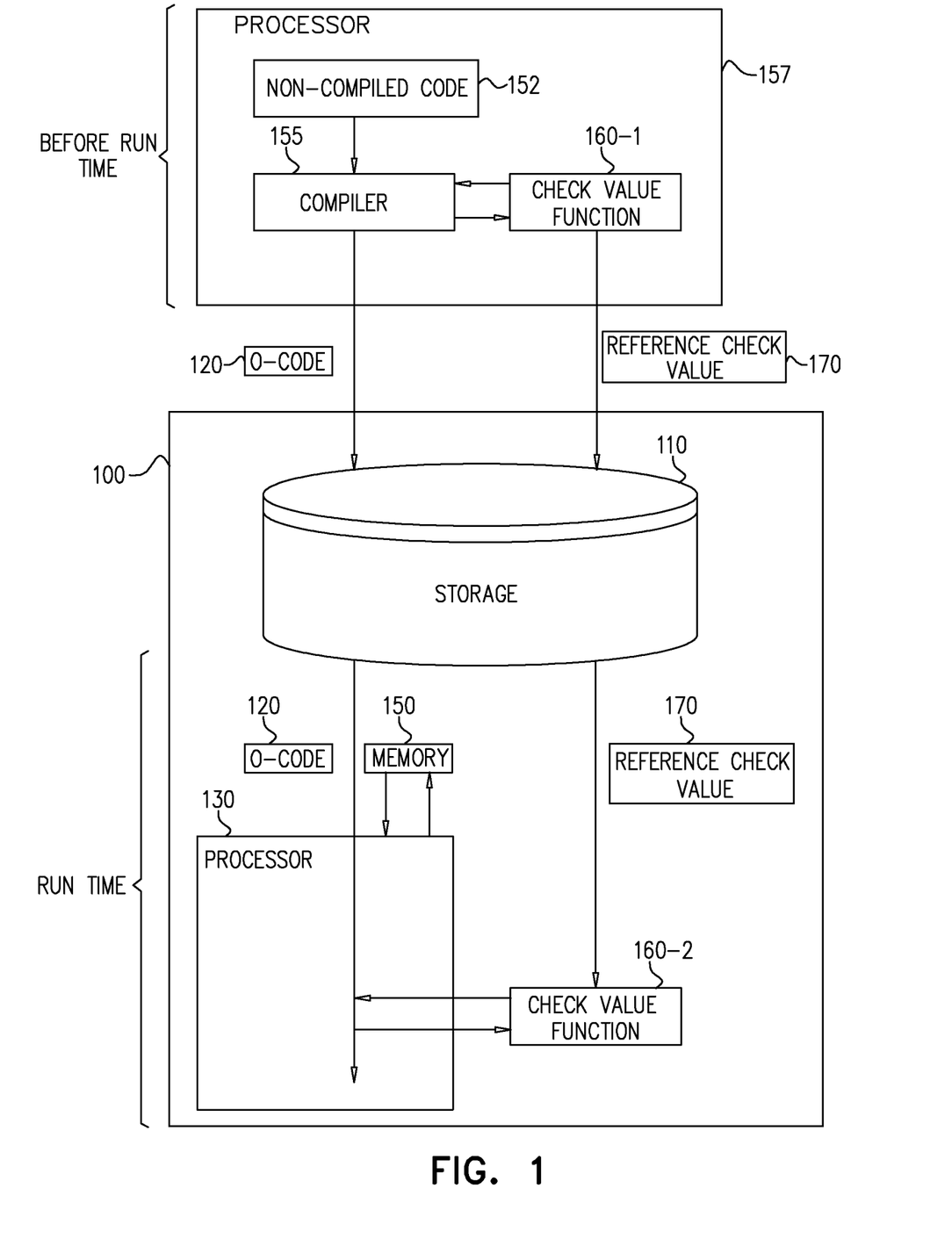
FIG. 1 is a simplified pictorial illustration of a system for ensuring program code flow integrity constructed and operative in accordance with an embodiment of the present disclosure.

Reference is now made to FIG. 1, which is a simplified pictorial illustration of a system for ensuring program code flow integrity constructed and operative in accordance with an embodiment of the present disclosure. The system of FIG. 1 comprises a computing device 100 is operative to run at least one secure computational application. The computing device 100 comprises a storage 110, which stores an application program to be run by the at least one secure computational application. The application program is stored as o-code (object code) 120, an intermediate language emitted by an intermediate compiler, which may then be executed in a processor 130 on the computing device 100. The storage 110 typically comprises non-transitory computer-readable storage media (i.e. long-term, i.e., non-volatile, memory), such as is known in the art. Alternatively, the o-code 120 may be stored in memory, such as memory 150, as will be described below.

The processor 130, typically a secure processor, typically comprises dedicated hardware logic circuits, in the form of an application-specific integrated circuit (ASIC), field programmable gate array (FPGA), or full-custom integrated circuit, or a combination of such devices. Alternatively or additionally, the processor 130 may be a programmable processor, such as a microprocessor or digital signal processor (DSP), under the control of suitable software. This software may be downloaded to the processor 130 in electronic form, over a network, for example. Alternatively or additionally, the software may be stored on tangible storage media, such as optical, magnetic, or electronic memory media. The processor 130 may comprise more than one processor 130. The processor 130 may be a special purpose dedicated processor operative to perform the method for ensuring program code flow integrity as described herein.

A memory 150, typically comprising non-transitory computer-readable storage media is available for use by the processor 130. The memory may store instructions, which the processor 130 may execute, in order to perform the method described herein. The computing device 100 also comprises typical and standard hardware and software components as are known in the art. The computing device 100 is provided as an example of a possible platform that may be used in the system described herein, and other types of platforms may be used as is known in the art.

A check value function 160-1 is used by the processor 130 during the operation of the compiler 155, as will be described herein below.

Additionally, before run time, non-compiled code 152 is input into a compiler 155 which is running on a second processor 157. The compiler 155 compiles the non-compiled code 152 into the o-code 120. As noted above, the o-code 120 is then stored in one or both of the storage 110 or memory 150. An iteration of the check value function 160-2 is used by a processor 130 (detailed below) during the execution of the o-code 120, as will be described herein below.

The second processor 157 is depicted as being external to the computing device 100. However, the second processor 157 may be the same processor as the processor 130, or may be a different processor, which is also disposed in the computing device 100. It is also noted that two different configurations of the check value function 160-1, 160-2 are depicted. In one depiction (the run time depiction), the check value function 160-2 is depicted as external to the processor 130. In another depiction (the before run time depiction), the check value function 160-1 is depicted as being executed by the second processor 157 (i.e. both the compiler 155 and the check value function 160-1 are run by the second processor 157).

The operation of the system of FIG. 1 is now described. At a first stage, the application program is compiled by the compiler 155 into o-code 120 which is stored in the storage 110. At least one line of the o-code 120 is sent to a check value function 160-1 which is executed by the processor 157. The check value function 160-1, 160-2 may be any appropriate iterative update function. By way of example, the check value function 160-1, 160-2 may be a proprietary iterative update function, a CRC (cyclic redundancy check) function, a checksum function, a hash function which is not a CRC or checksum function. Examples of CRC functions include: CRC-8, CRC-16, and CRC-32, etc. Examples of checksum functions include: sum8, xor8, and Adler 32, etc. Examples of non-CRC and non-checksum hash functions include: MD2, MD4, (i.e., Message-Digest-2, Message-Digest-4), SHA-1, SHA-3, (i.e., Secure Hash Algorithm-1, Secure Hash Algorithm-3) and so forth.

A reference check value 170 for the at least one line of the o-code 120 is returned by the check value function 160-1, and is stored in the storage 110.

It is appreciated that the first stage may be performed off-line, at a single computing device 100, and then the stored o-code 120, and the stored reference check value 170 may then be copied to storage 110 comprised on one or more other computing devices 100.

At a later stage, typically at run-time of the application program, the o-code 120 is executed as an executable application program by the processor 130. During execution of the o-code 120, the at least one line of the o-code 120 is sent to the check value function 160-2. A run-time check value is returned by the check value function 160-2. The run time-check value for the at least one line of the o-code 120 is compared to the reference check value 170 for it corresponding at least one line of the o-code 120. If the two values match, then security of the application program is assumed to be uncompromised. If the two values do not match, then the security of the application program is assumed to be compromised, and the application program may trigger a reset, an interrupt, set a flag, or execute another appropriate response, as is known in the art.

The o-code 120 may comprise code steps which are to be executed linearly, or, alternatively, the steps may branch into at least two paths, each one of which is to be executed under different circumstances, as is known in the art. For example, if one variable is less than a certain amount a loop is to be entered, otherwise the loop is to be skipped or exited from. However, branches present a difficulty in that, at compilation, they typically, because execution flow is not deterministic, it is difficult to know in advance what a correct reference check value 170 would be for a given run time-check value during the execution of the branch. Accordingly, at branch points in the o-code 120, the run-time check value is stored as a pre-branch run-time check value. Upon exiting the branch of the o-code 120, the run-time check value of the executing application program is reset to the pre-branch run-time check value.

Figure 2:
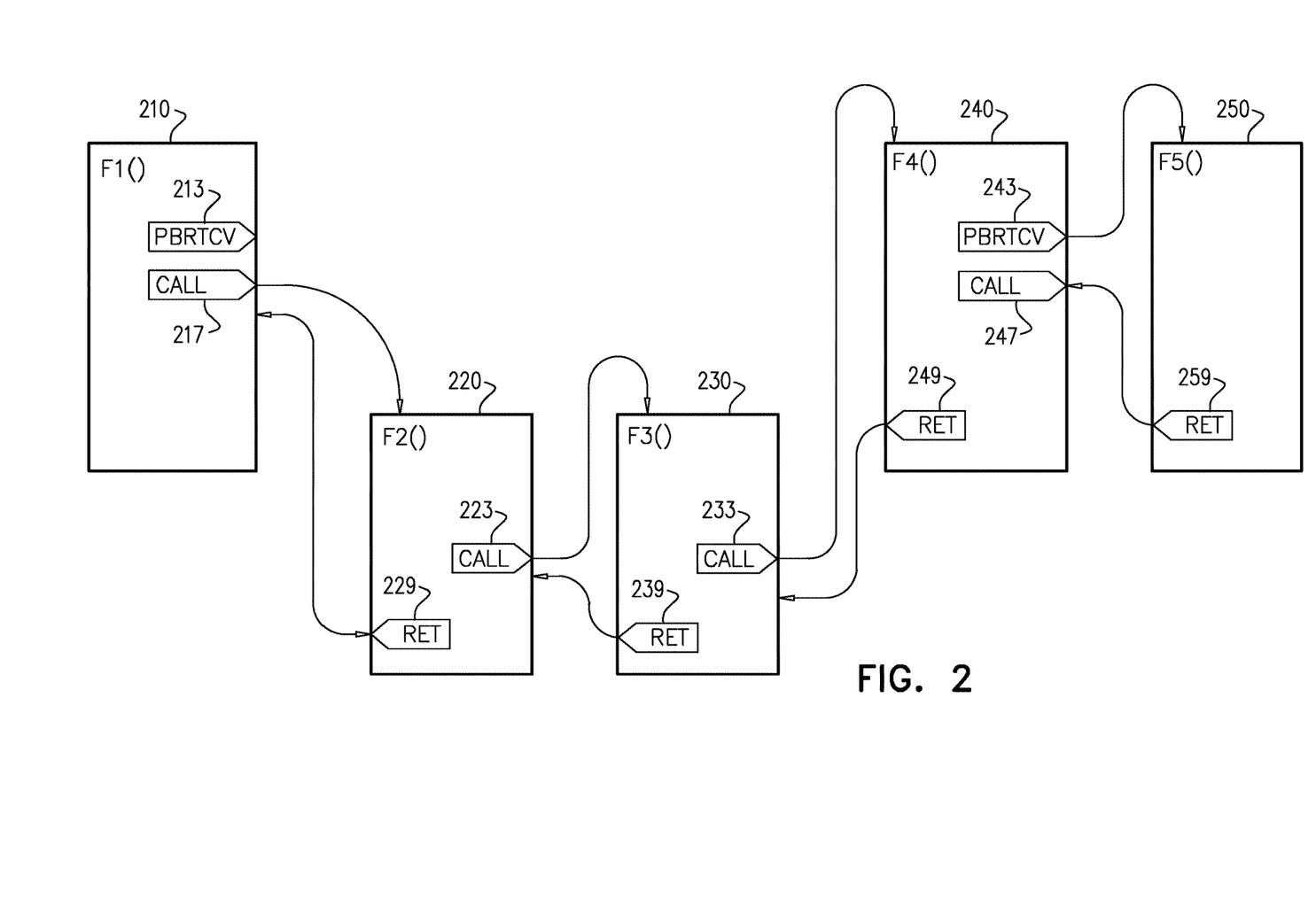
FIG. 2 is a simplified block diagram indicating a chain of functions, some of which implement one method of the system of FIG. 1.

The operation of the system of FIG. 1 is now further explicated with reference to FIG. 2. FIG. 2 is a simplified block diagram indicating a chain of functions, some of which implement one method of the system of FIG. 1. A first function, F1( ) 210, is being executed by the processor 130 of FIG. 1. At some point in the execution of F1( ) 210, a branch point is reached. As a result of reaching the branch point, the processor 130 (FIG. 1) determines that a second function, F2( ) 220 is to be run. Before exiting function F1( ) 210, the processor 130 (FIG. 1) executes an instruction 213 to store the pre-branch run-time check value (PBRTCV). The pre-branch run-time check value is determined and stored as described above with reference to FIG. 1. Once the PBRTVC is determined and stored, a call 217 to function F2( ) 220 is reached. The processor 130 (FIG. 1) then executes function F2( ) 220 until a call 223 to execute function F3( ) 230 is reached. The processor 130 (FIG. 1) then executes function F3( ) 230 until a call 233 to execute function F4( ) 240 is reached.

It is appreciated that function F1( ) 210 requires calculation of the PBRTCV before F2( ) 220 is executed. However, in the example in FIG. 2, functions F2( ) 220 and F3( ) 230 do not requires calculation of the PBRTCV before exiting these functions to their respective called function. A flag for each function may indicate whether or not check values are to be determined by the check value function 160-2 (FIG. 1) for each of the functions at run-time. Accordingly, in the example of FIG. 2, functions F1( ) 210 and F( ) 240 have their respective check value flags set, and the check value function 160-2 (FIG. 1) is invoked for the steps of functions F1( ) 210 and F( ) 240. By contrast, the check value flags of functions F2( ) 220 and F3( ) 230 are not set, and thus, the check value function 160-2 (FIG. 1) is not invoked during the execution of functions F2( ) 220 and F3( ) 230. Other methods besides a flag which are known in the art may also be used to invoke the execution of the check value function 160-2 (FIG. 1). It is appreciated that the present example is describing run time, hence check value function 160-2 is referred to. At compilation into o-code (such as o-code 120), check value function 160-1 would be invoked.

It is also appreciated that traps and interrupt events which may be located in the o-code are typically handled by not invoking the check value function 160-2 (FIG. 1). When returning from the interrupt routine back to the executing function, the check value function 160-2 (FIG. 1) will resume from where it was stopped.

During the execution of function F4( ) 240, the processor 130 (FIG. 1) determines that yet another function, F5( ) 250 is to be run. Before exiting function F4( ) 240, the processor 130 (FIG. 1) executes an instruction 243 to store the PBRTCV. The pre-branch run-time check value is determined and stored as described above with reference to FIG. 1. Once the PBRTVC is determined and stored, a call 247 to function F5( ) 250 is reached. The processor 130 (FIG. 1) then executes function F5( ) 250.

During the execution of function F5( ) 250, a return (RET) step 259 is reached, and a return value of the function F5( ) 250 is returned to calling function F4( ) 240. Function F4( ) 240 then resets its check value to the PBRTCV 243 stored prior to calling function F5( ) 250. The execution of function F4( ) 240 continues until a return (RET) step is reached, and a return value of the function F4( ) 240 is returned to calling function F3( ) 230. The execution of function F3( ) 230 continues until a return (RET) step 239 is reached, and a return value of the function F3( ) 230 is returned to calling function F2( ) 220. The execution of function F2( ) 220 continues until a return (RET) step 229 is reached, and a return value of the function F2( ) 220 is returned to calling function F1( ) 210. Function F1( ) 210 then resets its check value to the PBRTCV 213 stored prior to calling function F2( ) 220. The execution of function F1( ) 210 continues until complete, and the processor 130 (FIG. 1) proceeds according to the remaining o-code 120 (FIG. 1) to be compiled.

Figure 3:
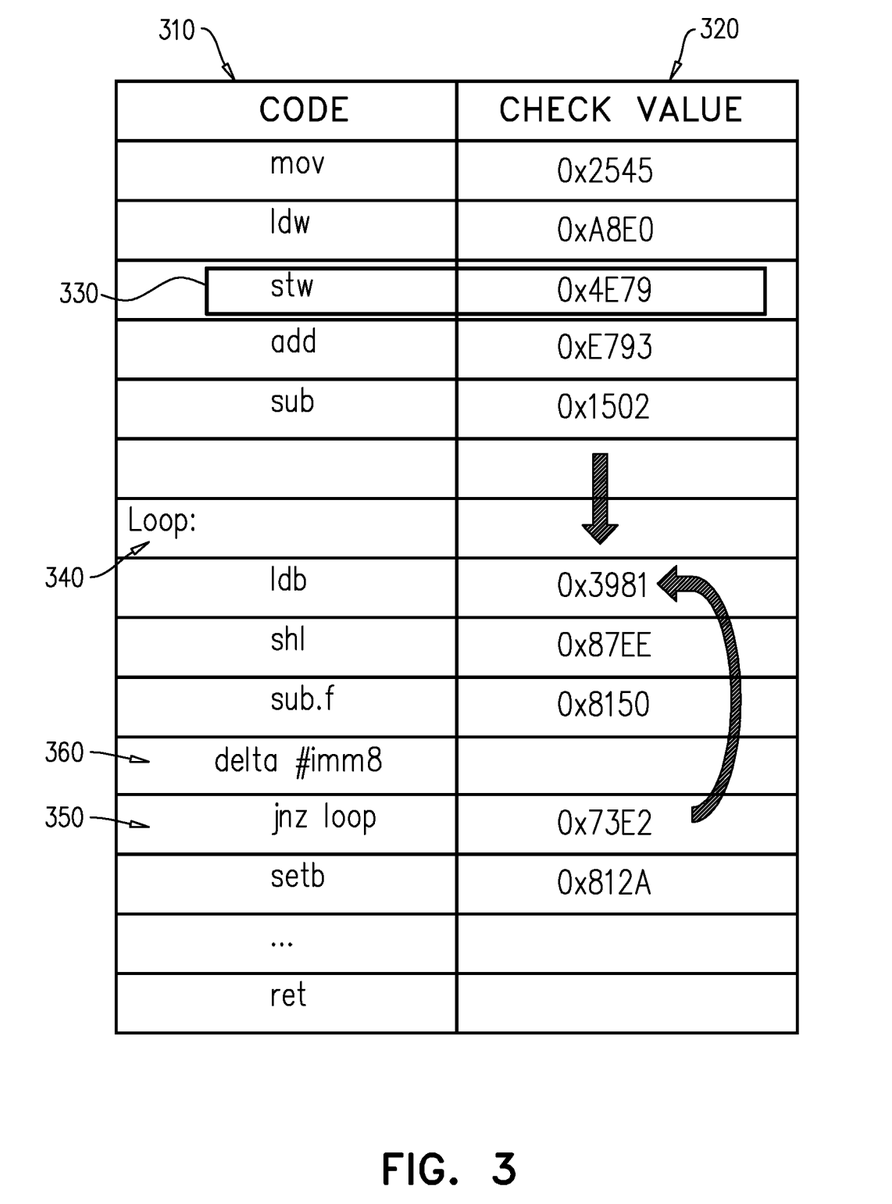
FIG. 3 is a first exemplary embodiment of conditional branch handling according to one method of the system of FIG. 1.

Reference is now made to FIG. 3, which is a first exemplary embodiment of conditional branch handling according to one method of the system of FIG. 1. As noted above, when the processor 130 reaches a branch instruction in the o-code, and if the branch is to be taken, the check value function 160-2 is invoked, and the pre-branch run-time check value is determined prior to execution of the branch. (If the branch is not taken, then the pre-branch run-time check value need not be determined). Accordingly, FIG. 3 shows a series of o-code instructions in the CODE column 310, and a check value (which may be either the reference check value or the run-time check value in a non-compromised execution environment) in the CHECK VALUE column 320. Each of the instructions in the CODE column 310 is shown with its corresponding check value. Thus, for example, the stw instruction has a corresponding check value of 0x4E79 (noted by the box with item number 330).

A loop (item number 340) is entered into by the executing code. As is known in the art, loops typically have a condition, called the "loop condition" (i.e. a branch condition) which is used to determine whether to execute another iteration of the loop or to exit the loop. In the present example, the loop condition is signaled by a jnz instruction (i.e. Jump if Accumulator not Zero instruction) (item number 350). The jnz instruction (item number 350) signals the processor 130 (FIG. 1) to return to the start of the loop (item number 340) if a loop variable is not zero. Prior to executing the jnz instruction (item number 350), a delta #imm8 instruction 360 is executed. The delta #imm8 instruction 360 causes the processor 130 (FIG. 1) to invoke the check value function 160-2 (FIG. 1), and, in the present example to save an 8-bit argument which is sent to the check value function 160 (FIG. 1) as a parameter. The check value function 160-2 (FIG. 1) returns a pre-branch run-time check value. Should the check value function 160-2 (FIG. 1) be a 16-bit or 32-bit or n-bit function (as discussed above), the parameter sent will have the proper number of bits. It is appreciated that the example depicted in FIG. 3 is by way of example only, and not intended to be limiting. The use of a loop and a jnz instruction provides an example where, prior to a next iteration of the loop, the delta #imm8 instruction 360 is invoked. Accordingly, during a next iteration of the loop, the check value has been restored to it's pre-loop value (i.e., 0x3981, as depicted in FIG. 3).

Persons of skill in the art will appreciate that there are many other appropriate o-code instructions which might be used prior to invoking the check value function 160-2 (FIG. 1) to return a pre-branch run-time check value.

Figure 4:
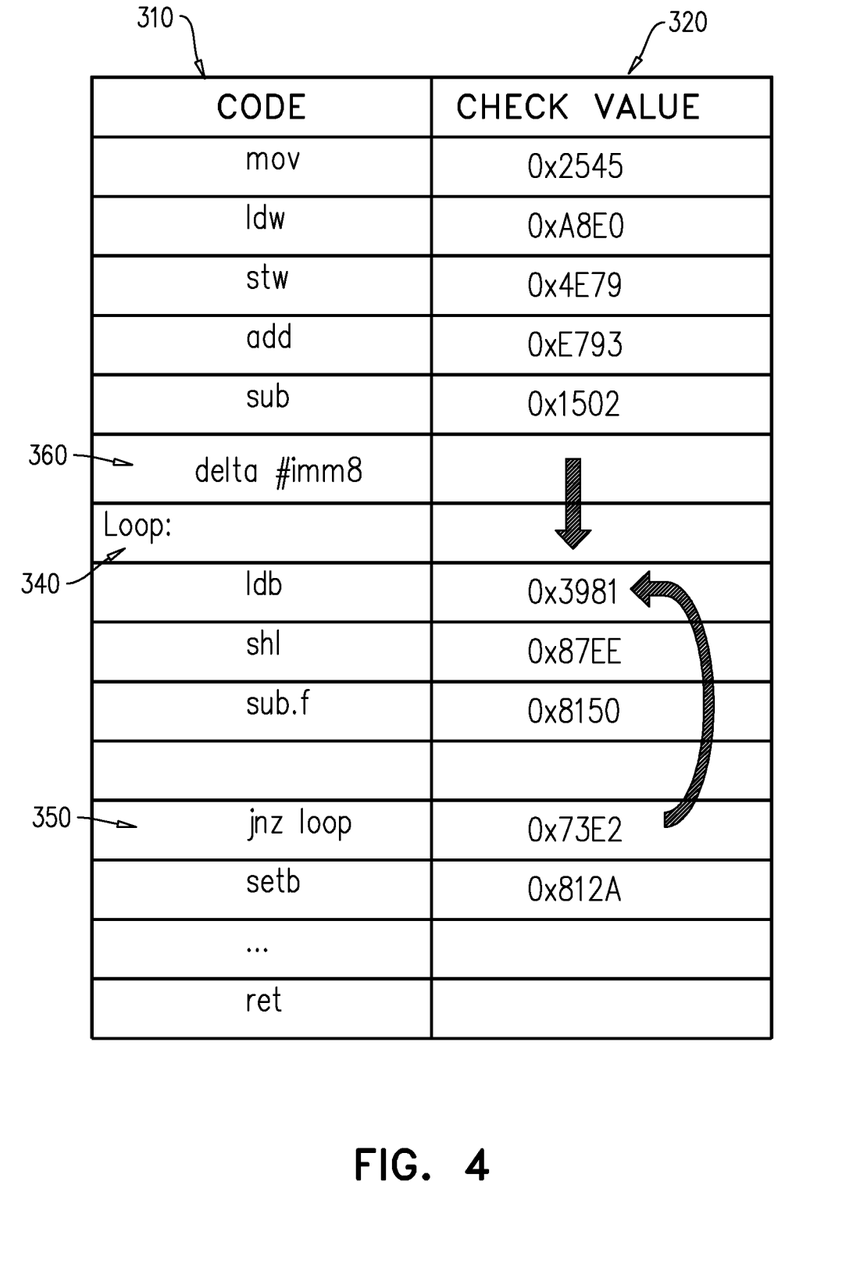
FIG. 4 is a second exemplary embodiment of conditional branch handling in one method of the system of FIG. 1.

Reference is now made to FIG. 4, which is a second exemplary embodiment of conditional branch handling in one method of the system of FIG. 1. FIG. 4 is similar to the example of FIG. 3. However, in FIG. 3, the example depicts a case where the delta #imm8 instruction 360 is executed in every iteration of the loop of the example. It is appreciated that repeatedly executing the delta #imm8 instruction 360 will amplify the overhead of execution of the delta instruction times the number of loop iterations. To mitigate this effect, in cases where linear code is executed (i.e. where there are no jumps within, from, and/or into a set of instructions in the code), the delta instruction 360 (in the present example, the delta #imm8 instruction) is executed prior to the first instruction, which is inside the loop 340. When the processor 130 (FIG. 1) executes the delta instruction 360, the parameter (in this case the 8-bit parameter specified by the #imm8 in the exemplary o-code of FIGS. 3 and 4) and the result of the delta instruction 360 (i.e. the return value from the check value function 170 of FIG. 1) is saved. Because there are no jumps into or within the loop in the example of FIG. 4, there is no need to repeatedly invoke the check value function 170 of FIG. 1.

Figure 5:
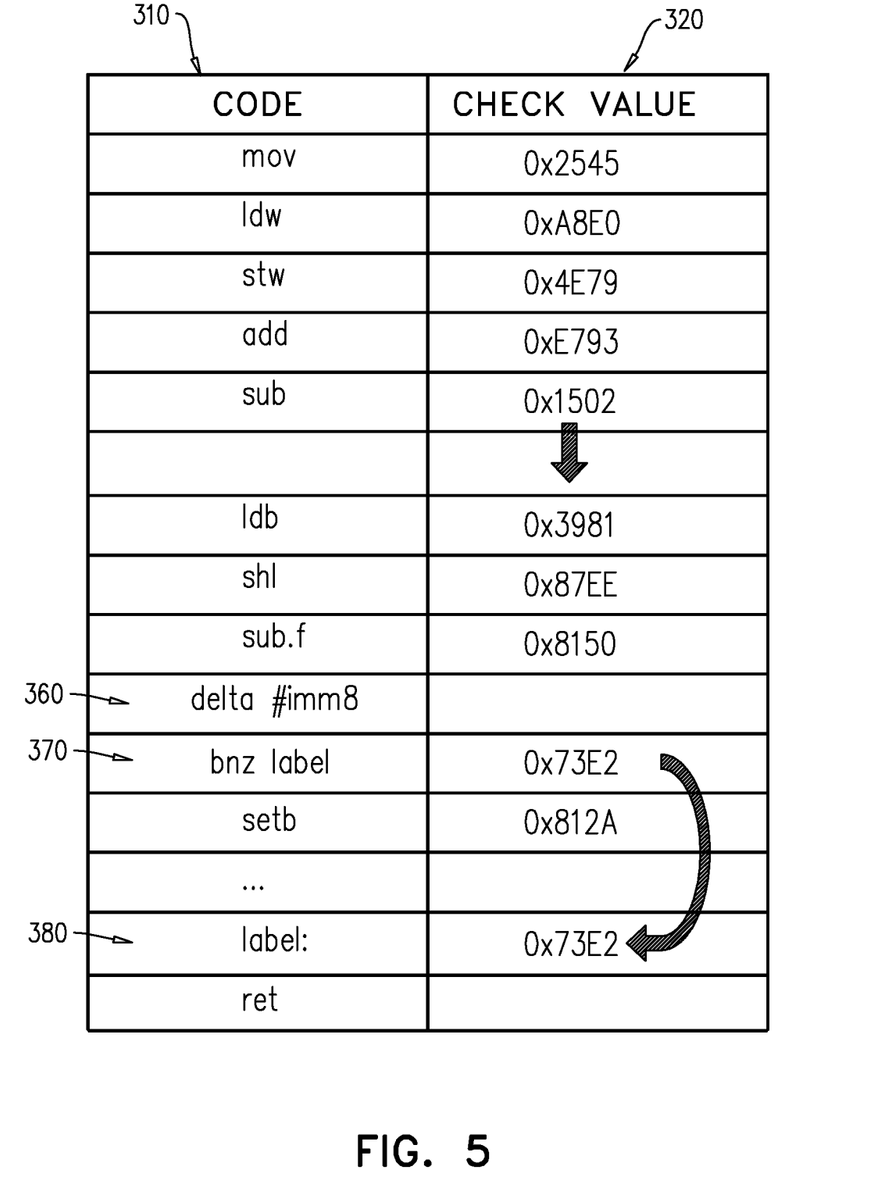
FIG. 5 is another exemplary embodiment of conditional branch handling in one method of the system of FIG. 1.

Reference is now made to FIG. 5, which is another exemplary embodiment of conditional branch handling in one method of the system of FIG. 1. FIG. 5 depicts a branch condition which results in a jump to a later stage in the code. Instruction 370 is a bnz label instruction, i.e. branch if not zero (bnz) to label 380. Since the delta #imm8 instruction 360 precedes the bnz instruction 370, when the branch condition is met, the execution of the exemplary code jumps to the label 380. The check value 320 associated with the label 380 is reset to 0x73E2, as indicated in the check value 320 column.

Figure 6:
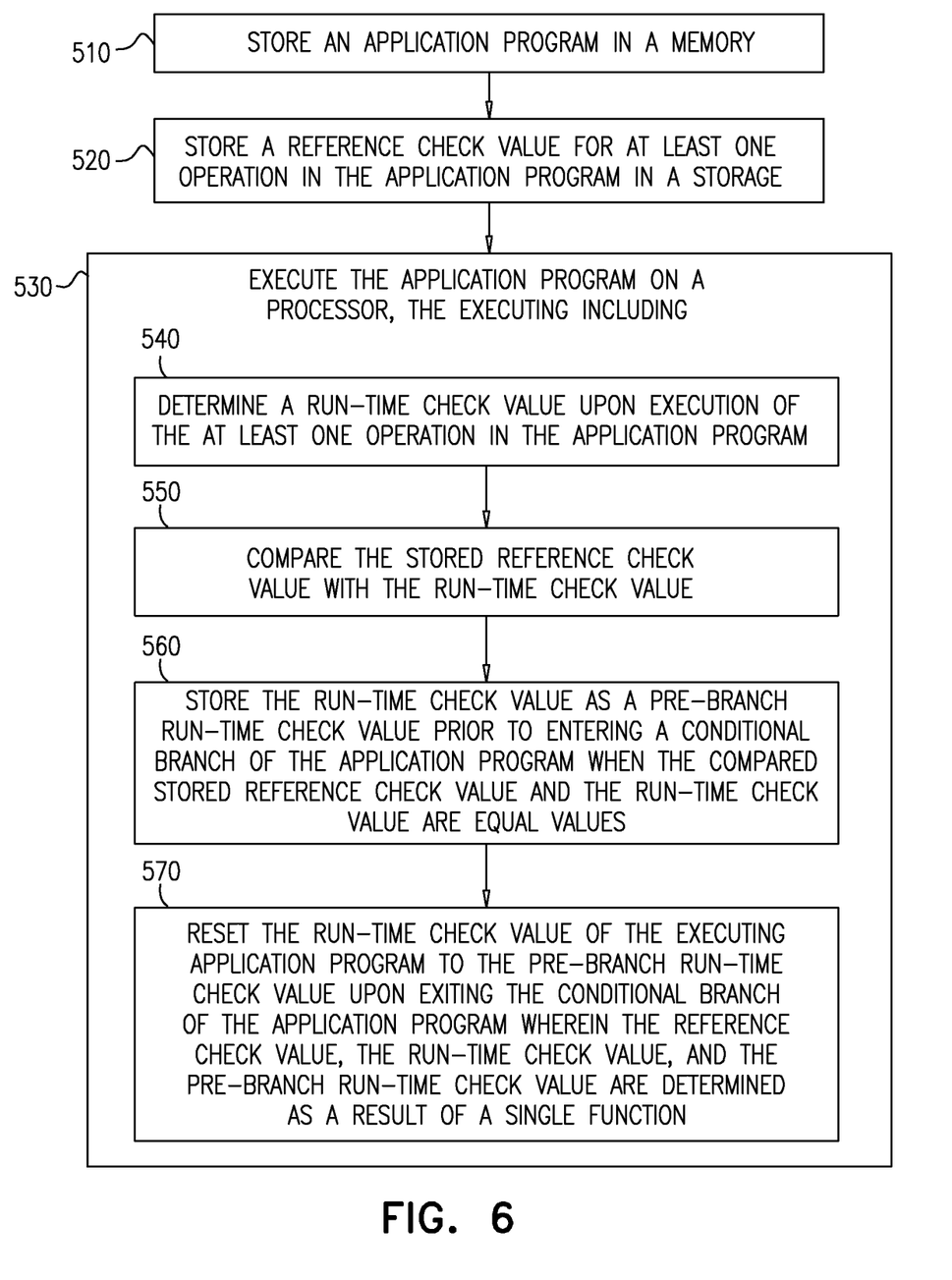
FIG. 6 is a flow chart is a flow chart of a method of operation for an embodiment of the present disclosure.

Reference is now made to FIG. 6, which is a flow chart is a flow chart of a method of operation for an embodiment of the present disclosure. At step 510 an application program, such as the o-code 120 of FIG. 1, is stored in a memory, such as the storage 110 of FIG. 1. At step 520, a reference check value 170 (FIG. 1) for at least one operation in the application program is stored in a storage, for example, the storage 110 of FIG. 1.

At step 530 the application program (i.e. the o-code 120 of FIG. 1) is executed on a processor, such as the processor 130 of FIG. 1. The execution of the application program includes:

determining the run-time check value upon execution of the at least one operation in the application program (step 540);

comparing the stored reference check value with the run-time check value (step 550);

storing the run-time check value as a pre-branch run-time check value prior to entering a conditional branch of the application program when the compared stored reference check value and the run-time check value are equal values (step 560); and the processor (e.g., the processor 130 of FIG. 1) resetting the run-time check value of the executing application program to the pre-branch run-time check value upon exiting the conditional branch of the application program (such as the o-code 120 of FIG. 1), wherein the reference check value, the run-time check value, and the pre-branch run-time check value are determined as a result of a single function (step 570).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A device comprising:
a memory operative to store an application program;
a storage operative to store a reference check value for at least one operation in the application program;
a processor operative to:
execute the application program;
determine a run-time check value upon execution of the at least one operation in the application program;
compare the reference check value with the run-time check value;
store the run-time check value as a pre-branch run-time check value prior to executing operations within a conditional branch of the application program in response to determining that the reference check value and the run-time check value are equal values; and
reset the run-time check value of the application program to the pre-branch run-time check value, stored prior to entering the conditional branch, upon exiting the conditional branch of the application program,
wherein the reference check value, the run-time check value, and the pre-branch run-time check value are determined as a result of a single function.

2. The device according to claim 1, wherein a processor external to the device determines the reference check value.

3. The device according to claim 1, wherein the application program is stored in the memory as object code.

4. The device according to claim 1, wherein the reference check value, the run-time check value, and the pre-branch run-time check value are determined as a result of an iterative update function.

5. The device according to claim 4, wherein the iterative update function comprises an 8-bit iterative update function.

6. The device according to claim 4, wherein the iterative update function comprises a 16-bit iterative update function.

7. The device according to claim 4, wherein the iterative update function comprises a cyclic redundancy check (CRC).

8. The device according to claim 4, wherein the iterative update function comprises a checksum function.

9. The device according to claim 4, wherein the iterative update function comprises a non-CRC, non-checksum hash function.

10. The device according to claim 4, wherein the iterative update function comprises a proprietary function.

11. A method comprising:
storing an application program in a memory;
storing in a storage a reference check value for at least one operation in the application program;
executing the application program on a processor, the executing comprising:
determining a run-time check value upon execution of the at least one operation in the application program;
comparing the reference check value with the run-time check value;
storing the run-time check value as a pre-branch run-time check value prior to executing operations within a conditional branch of the application program in response to determining that the reference check value and the run-time check value are equal values;
resetting the run-time check value of the application program to the pre-branch run-time check value, stored prior to entering the conditional branch, upon exiting the conditional branch of the application program,
wherein the reference check value, the run-time check value, and the pre-branch run-time check value are determined as a result of a single function.

12. The method according to claim 11, wherein an external processor determines the reference check value.

13. The method according to claim 11, wherein the application program is stored in the memory as object code.

14. The method according to claim 11, wherein the reference check value, the run-time check value, and the pre-branch run-time check value are determined as a result of an iterative update function.

15. The method according to claim 14, wherein the iterative update function comprises an 8-bit iterative update function.

16. The method according to claim 14, wherein the iterative update function comprises an 16-bit iterative update function.

17. The method according to claim 14, wherein the iterative update function comprises a cyclic redundancy check (CRC).

18. The method according to claim 14, wherein the iterative update function comprises a checksum function.

19. The method according to claim 14, wherein the iterative update function comprises a non-CRC, non-checksum hash function.

20. The method according to claim 14, wherein the iterative update function comprises a proprietary function.

* * * * *